United States Patent [19]

Spector et al.

[11] Patent Number: 4,569,399
[45] Date of Patent: Feb. 11, 1986

[54] SAFETY ENCLOSURE

[75] Inventors: Yechiel Spector; Amos Gonen, both of Tel Aviv; Shimon Raviv, Kiryat Ono, all of Israel

[73] Assignee: Spectronix Ltd., Tel Aviv, Israel

[21] Appl. No.: 628,138

[22] Filed: Jul. 11, 1984

Related U.S. Application Data

[63] Continuation of Ser. No. 278,704, Jun. 29, 1981, abandoned.

[30] Foreign Application Priority Data

Jul. 9, 1980 [IL] Israel .......................... 60528

[51] Int. Cl.⁴ .............................. A62C 35/12
[52] U.S. Cl. ......................... 169/66; 169/62; 220/88 R
[58] Field of Search ............... 169/66, 62, 69, 54; 220/88 R, 88 B; 215/12 R

[56] References Cited

U.S. PATENT DOCUMENTS

| 184,220 | 11/1876 | Trenchevant | 169/66 |
| 2,306,275 | 12/1942 | Murray | 220/88 R |
| 3,120,273 | 2/1964 | Kaufman et al. | 169/66 |
| 3,698,597 | 10/1972 | Burke | 169/62 |
| 3,764,035 | 10/1973 | Silverman | 220/88 R |
| 3,930,541 | 1/1976 | Bowman et al. | 169/66 |
| 4,328,901 | 5/1982 | Gunderman et al. | 220/88 R |

FOREIGN PATENT DOCUMENTS

| 2502881 | 7/1976 | Fed. Rep. of Germany | 169/66 |
| 492288 | 7/1919 | United Kingdom | 220/88 R |
| 685440 | 1/1953 | United Kingdom | 220/88 R |

*Primary Examiner*—H. Grant Skaggs
*Assistant Examiner*—Kenneth Noland
*Attorney, Agent, or Firm*—Handal & Morofsky

[57] ABSTRACT

A protective barrier or enclosure comprising a protective wall element including inner and outer wall portions, a protective liquid located between the inner and outer wall portions, the protective liquid being characterized in that it absorbs a significant amount of kinetic energy from a moving projectile passing therethrough, causing a pressure buildup in the liquid.

9 Claims, 3 Drawing Figures

SAFETY ENCLOSURE

This is a continuation application Ser. No. 278,704 filed June 29, 1981, now abandoned.

The present invention relates to fire prevention generally and more particularly to protective barriers and enclosures for preventing fire.

A major factor in the success of a fire prevention and extinguishing technique is the speed with which the preventative action is taken. Fire prevention and extinguishing techniques which rely on a human factor, i.e. an operator releasing extinguishant, are the slowest of such systems. Automatic fire extinguishing systems have been developed with pressure, thermal and optical sensors for automatically releasing extinguishant in response to a sensed fire condition. Such systems often suffer from the disadvantage that a relatively high threshold must be used to eliminate an unacceptable false alarm rate and thus the reaction time of the automatic sensing apparatus is extended.

There is known a protective barrier comprising an array of pipes containing a liquified extinguishing agent under high pressure which is disposed between a protected region an a potential source of incoming projectiles. Puncture of one of the pipes by an incident projectile causes release of the extinguishing agent at high pressure through the aperture formed in the pipe by the projectile. This known protective barrier suffers from the following disadvantages: (1) It does not appreciably slow the projectile or impede its progress to the protected area; (2) In order to project the extinguishing agent, it requires that a relatively small aperture be formed by the projectile. Otherwise the extinguishing agent pressure will be eliminated; (3) It tends to release extinguishing agent in all directions due to the high internal pressure in the pipes; (4) When not maintained under pressure, the extinguishing agent tends to vaporize and disperse in the atmosphere.

The present invention seeks to provide a protective barrier or enclosure which overcomes the above deficiencies and which provides a high degree of protection even for highly flammable goods, such as oxidizing materials.

There is thus provided in accordance with an embodiment of the present invention a protective barrier or enclosure comprising a protective wall element including inner and outer wall portions, a protective liquid located between the inner and outer wall portions, the protective liquid being characterized in that it absorbs a significant amount of kinetic energy from a moving projectile passing therethrough, causing a pressure buildup in the liquid.

Further in accordance with an embodiment of the present invention at least one of the inner and outer wall portions is frangible in response to the penetration of a projectile and/or the resulting pressure buildup for producing an immediate release of the protective liquid in response thereto.

Alternatively only one or more selected portions of a wall portion may be constructed to be frangible so as to direct the protective liquid to a desired region.

The protective liquid may be water or any other suitable liquid. The protective liquid may have cooling, fire extinguishing or any other desired characteristics or combination of characteristics.

The protective liquid may be maintained at atmospheric pressure in a sealed or open enclosure or alternatively at an elevated pressure as suitable for the desired protective application.

The invention will be more fully understood and appreciated from the following detailed description taken in conjunction with the drawing in which.

Figure 1:
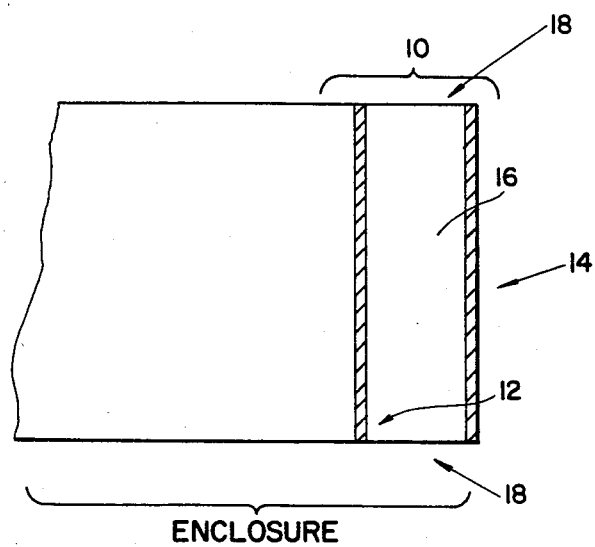
FIG. 1 is a partially cut-away schematic illustration of a protective enclosure constructed and operative in accordance with an embodiment of the invention.

Reference is now made to FIG. 1 which illustrates, in sectional format, an enclosure constructed and operative in accordance with an embodiment of the present invention.

The enclosure comprises a plurality of protective wall elements 10. It is noted that according to one embodiment of the invention, the entire enclosure may be formed of protective wall elements 10. Alternatively only selected, particularly vulnerable portions of the enclosures may be formed of the protective wall elements and the remainder of the enclosure may be constructed of conventional construction materials.

The protective wall elements 10 each comprise inner and outer wall elements 12 and 14, typically in the form of panels, which together with edge members 18 define a enclosure inside of which is provided a supply of protective liquid. The protective liquid is operative to absorb a significant amount of the kinetic energy of an impinging projectile passing therethrough.

In accordance with a preferred embodiment of the present invention the protective liquid comprises water. Alternatively any other suitable fire extinguishing agent such as a liquefied vaporizing extinguishing agent with low vapor pressure at standard temperature and pressure, such as Halon 1211 bromochlorodifluoromethane $CBrClF_2$, or Halon 2402 dibromotetrafluoroethane $CBrF_2CBrF_2$.

In accordance with one embodiment of the invention, a fire extinguishing agent 16 is maintained under pressure within a sealed enclosure defined by elements 12 and 14 and members 18. Alternatively the enclosure need not be sealed and the protective liquid need not be maintained under pressure. Normally the entire volume between elements 12 and 14 and members 18 is filled with the protective liquid, however this need not necessarily be the case.

In accordance with a preferred embodiment of the present invention wherein the protective liquid is water, the separation between the inner and outer wall elements 12 and 14 is 4 cm or greater.

Further in accordance with an embodiment of the invention, the protective wall elements 10 may selectably be constructed to have one or both of the inner and outer wall elements 12 and 14 or selected portions thereof burstable in response to the pressure buildup caused by the passage of a projectile thereinto or therethrough.

By a projectile is meant any type of projectile, solid or hollow and the shock phase that is produced thereby.

It is appreciated that there may be applications where it is desired that fire extinguishing materials escape from the wall elements 10 through only one of the inner and outer wall elements, or through both. The wall elements 12 and 14 may also be constructed to produce apertures in response to a pressure buildup of desired relative and absolute sizes, depending on whether a high pressure directed spray of fire extinguishing agent is desired, or alternatively whether a low pressure flow of such material into a protected region is desired.

Conventional pressure rupture discs may be incorporated into the wall elements. The wall elements 12 and 14 may be formed of any suitable material such as plastic or metal and may have selectable pressure responsive rupture characteristics.

Figure 2:
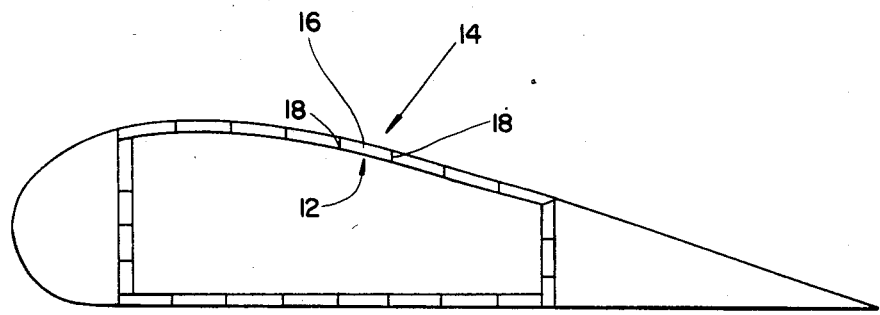
FIG. 2 is an illustration of an alternative embodiment of the present invention.

FIG. 2 illustrates an airplane fuel tank whose walls are formed of discrete protective wall elements according to the invention.

Figure 3B:
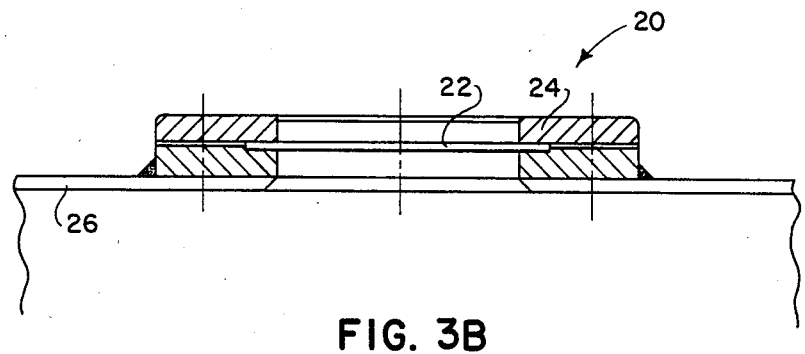
FIGS. 3A and 3B are respective plan and sectional illustrations of a portion of a wall element comprising a rupture disc.
Figure 3A:
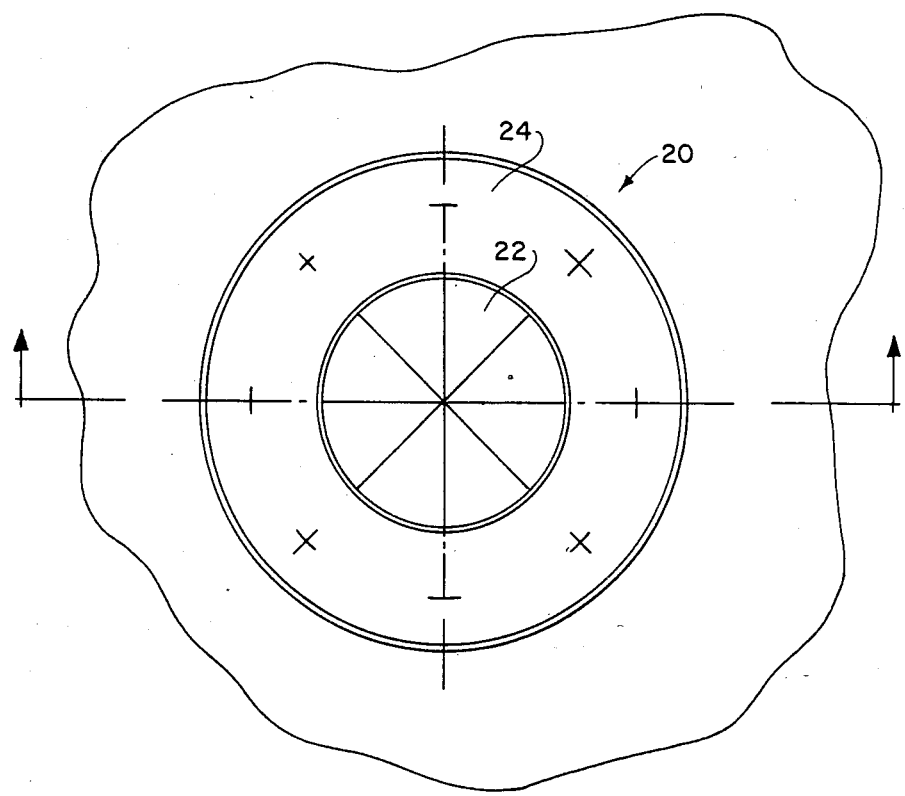

FIGS. 3A and 3B illustrate a portion of a protective wall element 20 formed with a rupture disc 22, which is attached thereto by a mounting flange 24 adjacent an aperture in the wall 26.

Experimental tests conducted by applicants have shown that a barrier constructed and operative in accordance with an embodiment of the invention and employing water as the protective liquid is effective in reducing the kinetic energy and thus the speed of incoming projectiles in the range of approximately MACH 1 to MACH 4 in liquid to a uniform speed of approximately 1.0–1.5 MACH in liquid.

It may thus be appreciated that the performance and protection afforded by the barrier constructed and operative in accordance with an embodiment of the present invention is no less than that of a comparable thickness of steel.

It will be appreciated by persons skilled in the art that the invention is not limited to what has been particularly shown and illustrated hereinabove. Rather the scope of the present invention is defined only by the claims which follow:

We claim:

1. A protective barrier, comprising:
   a plurality of non-intercommunicating protective wall elements including substantially parallel inner and outer wall portions;
   a protective liquid located between said inner and outer wall portions, said protective liquid being characterized in that it absorbs kinetic energy from a projectile passing therethrough resulting in a pressure build-up therein;
   at least one of said inner and outer wall portions including a selected portion which is frangible in response to said pressure build-up for producing an immediate directed and pressurized flow of said protective liquid in response thereto, the location and size of said selected portion being selected to provide a desired directed spray of said protective liquid at a protected region
   and wherein at least a portion of one of said inner and outer wall portions is frangible and comprises a main portion and at least one localized frangible element which is frangible in response to said pressure buildup for producing an immediate release of said protective liquid in response thereto.

2. A protective barrier according to claim 1 and wherein said inner wall portion is frangible in response to said pressure buildup.

3. A protective barrier according to claim 1 and wherein said outer wall portion is frangible in response to said pressure buildup.

4. A protective barrier according to claim 1 and wherein at least one of said inner and outer wall portions is frangible in response to penetration thereof by a projectile.

5. A protective barrier, comprising:
   a plurality of non-intercommunicating protective wall element including substantially parallel inner and outer wall portions;
   a protective liquid located between said inner and outer wall portions, said protective liquid being characterized in that it absorbs kinetic energy from a projectile passing therethrough resulting in a pressure build-up therein;
   at least one of said inner and outer wall portions including a selected portion which is frangible in response to said pressure build-up for producing an immediate directed and pressurized flow of said protective liquid in response thereto, the location and size of said selected portion being selected to provide a desired directed spray of said protective liquid at a protected region
   and comprising a pressure responsive rupture element associated with said protective wall element and arranged to provide a flow of protective liquid in a desired direction.

6. A protective barrier according to claim 5 and wherein said protective liquid comprises water.

7. A protective barrier according to claim 5 and wherein said protective liquid is maintained in a sealed enclosure.

8. A protective barrier according to claim 7 and wherein said protective liquid is maintained at atmospheric pressure.

9. A protective barrier according to claim 7 and wherein said protective liquid is maintained at a positive pressure.

* * * * *